United States Patent
Qi et al.

(10) Patent No.: US 8,956,992 B2
(45) Date of Patent: Feb. 17, 2015

(54) SCR CATALYSTS PREPARATION METHODS (75) Inventors: Gongshin Qi, Troy, MI (US); Wei Li, Troy, MI (US); Lei Wang, Beijing (CN)

(73) Assignees: GM Global Technology Operations LLC, Detroit, MI (US); Tsinghua University, Beijing (CN)

(*) Notice: Subject to any disclaimer, the term of this patent is extended or adjusted under 35 U.S.C. 154(b) by 485 days.

(21) Appl. No.: 13/282,594

(22) Filed: Oct. 27, 2011

(65) Prior Publication Data
US 2013/0108544 A1     May 2, 2013

(51) Int. Cl.
| | | |
|---|---|---|
| *B01J 27/182* | (2006.01) | |
| *B01J 29/06* | (2006.01) | |
| *C01B 33/26* | (2006.01) | |
| *B01J 29/85* | (2006.01) | |
| *C01B 37/08* | (2006.01) | |
| *C01B 39/54* | (2006.01) | |
| *B01J 35/00* | (2006.01) | |
| *B01D 53/94* | (2006.01) | |

(52) U.S. Cl.
CPC .............. B01J 29/85 (2013.01); C01B 37/08 (2013.01); C01B 39/54 (2013.01); B01J 35/002 (2013.01); *B01J 2229/183* (2013.01); *B01J 2229/186* (2013.01); *B01J 2229/36* (2013.01); *B01D 53/9418* (2013.01); *B01D 2255/104* (2013.01); *B01D 2255/20738* (2013.01); *B01D 2255/20746* (2013.01); *B01D 2255/20761* (2013.01); *B01D 2255/50* (2013.01)
USPC .............................. 502/214; 502/60; 423/400

(58) Field of Classification Search
USPC ..................... 502/214, 60; 423/700
See application file for complete search history.

(56) References Cited

U.S. PATENT DOCUMENTS

| | | | |
|---|---|---|---|
| 6,376,562 B1 | 4/2002 | Ihm et al. | |
| 7,601,662 B2 | 10/2009 | Bull et al. | |
| 2008/0241060 A1* | 10/2008 | Li et al. | 423/700 |
| 2010/0092362 A1* | 4/2010 | Li et al. | 423/239.2 |
| 2010/0290963 A1 | 11/2010 | Andersen et al. | |

FOREIGN PATENT DOCUMENTS

WO      2008132452       11/2008

OTHER PUBLICATIONS

Frache et al., "Catalytic DeNOx activity of cobalt and copper ions in microporous MeALPO-34 and MeAPSO-34", Catalysis Today, 75, pp. 359-365, 2002.*
Karge, "Solid-State Ion Exchange in Zeolites", section 2.4.3 of Handbook of Heterogeneous Catalysis, pp. 484-510, Mar. 2008.*
Maggie Zamadics et al.; Solid-State Ion Exchange in H-SAPO-34: Electron Spin Resonance and Electron Spin Echo Modulation Studies of Cu(II) Location and Adsorbate Interaction; J. Physics. Chem. 1992, 96, 5488-5491.
Jiang Ming et al; Characterization of Cu(I)Y Zeolites Prepared by Solid-state Ion Exchange; ACTA Physico-chimica Sinica, vol. 13, No. 9; Sep. 1997; pp. 822-825.

* cited by examiner

*Primary Examiner* — Elizabeth Wood
(74) *Attorney, Agent, or Firm* — Reising Ethington P.C.

(57) ABSTRACT

A method of replacing or exchanging non-metal charge balancing cations located at ion-exchanges sites within SAPO frameworks with cations of a transition metal using a solid state ion-exchange process. Transition metal-containing particles are formed on surfaces of SAPO particles, and thereafter the particles are heated in air to initiate the solid-state ion-exchange process. The transition metal-containing particles and the SAPO particles are heated to a temperature and for an amount of time to produce transition metal cations, and for the transition metal cations to replace at least a portion of the non-metal cations located within the SAPO frameworks.

15 Claims, 2 Drawing Sheets

SCR CATALYSTS PREPARATION METHODS

TECHNICAL FIELD

This disclosure pertains to methods of preparing base metal ion-exchanged silicoaluminophosphate (SAPO) materials for use as catalysts in the selective reduction of $NO_X$ using a reductant of ammonia ($NH_3$). The SAPO materials may be ion-exchanged with ions of cobalt (Co), copper (Cu), iron (Fe), or silver (Ag) to increase the selectivity and NO reduction activity of the SAPO catalysts.

BACKGROUND OF THE INVENTION

Selective catalytic reduction (SCR) is a known method for catalytically reducing nitrogen oxides ($NO_X$) to $N_2$ and water in high $O_2$-content gas streams using a reductant material, such as ammonia ($NH_3$). Such gas streams may be produced, for example, by diesel engines, some gasoline fueled engines and many hydrocarbon-fueled power plants as exhaust gases. The exhaust gases from such engines are typically passed through exhaust aftertreatment systems that contain a collection of catalyst materials designed to treat the exhaust gases. When the SCR method of exhaust gas treatment is employed, the reductant material is injected into the exhaust gas stream upstream of a suitable catalyst material. In the presence of the catalyst, an amount of $NO_X$ in the gas stream is reduced to $N_2$ and water using the reductant. Selective catalytic reduction systems using $NH_3$ as the reductant in exhaust aftertreatment systems are sometimes referred to as "$NH_3$-SCR" systems.

Silicoaluminophosphates (SAPOs) are currently being studied for use as the catalyst material in SCR systems because of their selectivity in the reduction of $NO_X$, opposed to the oxidation of $NH_3$, in addition to their excellent hydrothermal durability. SAPOs are synthetic microporous crystalline materials having an aluminophosphate framework, with silicon atoms incorporated therein. The framework of SAPO-n consists of tetrahedral oxides of $SiO_2$, $AlO_2^-$ and $PO_2^+$, where n denotes a particular framework type. Negative framework charges occur within SAPO frameworks when there are more aluminum atoms than phosphorus atoms within the framework. These negative framework charges are typically balanced by $H^+$ cations (i.e., positively charged ions) after the SAPO materials are synthesized and calcined; this form is usually referred to as H-SAPO-n.

To increase the selectivity and $NO_X$ reduction activity of SAPO-based catalyst materials, the non-metal charge balancing cations, such as $H^+$, located within the SAPO frameworks may be replaced or exchanged, to some extent, by transition metal cations to form Me-SAPO, where Me denotes the cation-exchanged metal. Current ion-exchange methods involve immersing SAPO particles in a metal salt solution comprising cations of a transition metal and anions of a non-metal. In this method of ion-exchange, the SAPO particles are typically immersed in the metal salt solution for a relatively long period of time (e.g., 2-24 hours) with stirring. In addition, this immersion step may need to be repeated several times in order to obtain uniformly high ion-exchange levels throughout the SAPO frameworks. Accordingly, this liquid ion-exchange method typically produces a large amount of wastewater.

There is therefore a need for a more efficient method of replacing or exchanging charge balancing non-metal cations with transition metal cations in SAPO frameworks having negative framework charges.

SUMMARY OF THE INVENTION

This invention provides an efficient and effective process for placing copper cations, or other transition metal cations, in SAPO crystalline frameworks for catalyst applications. Such catalyst applications may be, for example, the selective catalytic reduction of $NO_X$ in exhaust gas streams from lean burn engines, such as diesel engines.

In one embodiment, non-metal charge balancing cations, such as $H^+$ or $NH_4^+$, located at the ion-exchanges sites of SAPO frameworks are replaced or exchanged with cations of a transition metal using a solid state ion-exchange process. Transition metal salt particles or transition metal oxide particles are formed on surfaces of SAPO particles, and thereafter the SAPO particles are heated in air to initiate the solid-state ion-exchange process. The transition metal-containing particles may be formed on external surfaces and/or within micropores of the of the SAPO particles. During a high-temperature solid-state ion-exchange process, a significant portion of the non-metal cations located within the SAPO frameworks are replaced by cations of the transition metal.

In one embodiment, the transition metal cation comprises at least one of cobalt (Co), copper (Cu), iron (Fe), or silver (Ag), and the ion-exchanged SAPO particles can be used as catalysts to selectively catalyze the reduction of $NO_X$ in $O_2$-containing gas streams using a reductant. In suitable embodiments, the reductant comprises ammonia and/or hydrocarbons.

In suitable embodiments, the amount of metal salt particles or metal oxide particles formed on the surfaces of the SAPO particles is controlled so that the prepared Me-SAPO particles comprise about 0.5-3 wt. % Me. The term "salt," as used herein, refers to electrically neutral ionic compounds comprising cations (positively charged ions) and anions (negative ions). In suitable embodiments, the transition metal salt particles formed on surfaces of SAPO particles may comprise hydroxides, nitrates, chlorides, acetates, acetylacetonates, oxalates, sulfates, carbonates, and mixtures thereof. Preferably, the salt is selected so as to introduce catalytic components of a transition metal into the SAPO crystal structure without introducing other unwanted elements.

In one embodiment, transition metal salt particles are formed on surfaces of the SAPO particles by precipitating insoluble transition metal salt particles from an aqueous solution. Particles of a soluble transition metal salt, such as copper acetate, are dissolved in an aqueous solution, and thereafter a predetermined amount of the solution is added to a mixture of SAPO particles and a precipitating agent, such as oxalic acid. The precipitating agent may be in the form of solid particles or it may be dispersed within a liquid medium. The soluble salt reacts with the precipitating agent in solution to produce transition metal salts that are not soluble in water. Accordingly, these insoluble transition metal salts quickly precipitate from the aqueous solution and form on the surfaces of the SAPO particles. After precipitation, the salt particles and the SAPO particles are suitably separated from the aqueous solution, such as by filtration, and dried. In suitable embodiments, the particles are dried in air at a temperature in the range of about 80-120° C. for about 4-24 hours, depending on the volume of SAPO particles.

In another embodiment, transition metal salt particles may be formed on the surfaces of the SAPO particles using an impregnation technique. Particles of a transition metal salt, such as copper acetate, are dissolved in an aqueous solution, and thereafter a predetermined volume of the solution is added to a volume of SAPO particles. The volume of solution added to the SAPO particles is minimized so that just enough liquid is used to fill the micropores of the SAPO particles. These wetted and impregnated SAPO particles are then heated to evaporate the liquid, thereby leaving transition metal salt particles on the surfaces of the SAPO particles. In suitable embodiments, the particles may be heated in air at a temperature in the range of about 80-120° C. for about 4-24 hours, depending on the volume of SAPO particles.

After transition metal salt particles have been formed on the SAPO particle surfaces, the particles are then heated or calcined to a temperature and for an amount of time to decompose the ionic transition metal salts. The transition metal salts are preferably heated so that the transition metal salts decompose and form oxides of the transition metal on the surfaces of the SAPO particles. In suitable embodiments, the salt particles and SAPO particles may be heated in air to a temperature in the range of about 300-600° C. for about 1-10 hours.

After transition metal oxide particles are formed on the surfaces of the SAPO particles, the oxide particles and the SAPO particles are heat-treated to initiate the solid-state ion-exchange process. During this heat-treatment step, the oxide/SAPO particles are heated to a temperature and for an amount of time to produce cations of the transition metal, and to replace or exchange a substantial portion of the non-metal cations within the SAPO frameworks with the transition metal cations, thereby forming Me-SAPO particles. In suitable embodiments, the particles are heated to a temperature in the range of about 500-800° C., more preferably about 650-750° C., for about 12-72 hours. The oxide/SAPO particles may be heated in humid air comprising 0.1-20 vol. % $H_2O$, or in air containing no water.

Suitable SAPO materials, such as SAPO-5, SAPO-11, SAPO-18, SAPO-34, SAPO-41, and SAPO-56, are thermally stable at the high temperature required to perform the solid-state ion exchange process. For example, SAPO-34 is found to be stable at temperatures up to 800° C. in air comprising at least 10 vol. % $H_2O$, SAPO-34 has a microporous crystalline structure, similar to the chabazite structure of some zeolites, and has regularly-sized micropores with 0.38 nm diameters. In addition, Cu-SAPO-34 particles exhibit particularly high catalytic activity for $NH_3$-SCR reactions.

It is found that this solid-state ion exchange process produces Cu-SAPO-34 particles in which a substantial portion of the negative framework charges are balanced by copper cations. Further, it is found that, by locating the copper cations at the catalytically-active ion-exchange sites within the SAPO frameworks, the NO conversion performance of the Cu-SAPO-34 particles can be optimized. Therefore, Cu-SAPO-34 particles prepared according to disclosed embodiments can be used to effectively catalyze the selective reduction of $NO_X$ when combined with $NH_3$ or a hydrocarbon in $O_2$-containing gas streams.

DESCRIPTION OF PREFERRED EMBODIMENTS

Figure 1A:
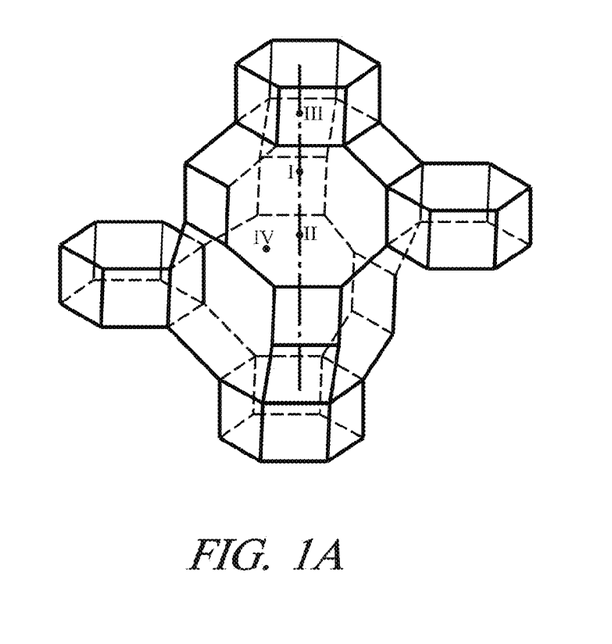
FIG. 1A is a schematic illustration of a structural unit of SAPO-34 depicting a central ellipsoidal cavity, which is interconnected to six smaller cavities (only four of the small cavities are shown). The cavities are framed by silicon, aluminum and phosphorus oxides. In this illustration, the vertexes represent either silicon, aluminum or phosphorus atoms and the lines connecting the vertexes represent oxygen bridges (—O—). The Roman numerals (I, II, III, and IV) indicate potential ion-exchange sites within the structural framework of SAPO-34. Each SAPO particle contains many of the structural units shown in FIG. 1A.
Figure 1B:
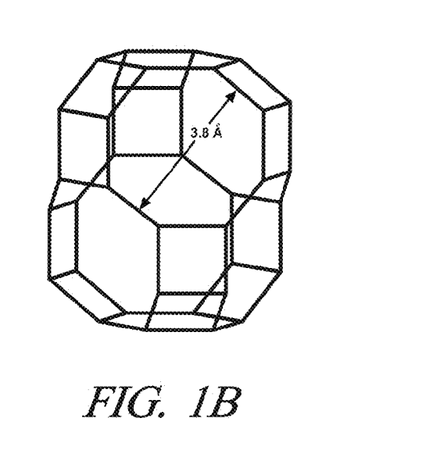
FIG. 1B is a schematic illustration of the framework of the central ellipsoidal cavity of SAPO-34 shown in FIG. 1A to better reveal the pore openings having diameters of 0.38 nm.

SAPO materials have an open microporous structure with small regularly sized pores. Because of their small pore size, these materials are sometimes referred to as "molecular sieves," in that they have the ability to sort molecules (or ions) based primarily on the size of the molecules or ions. For example, as shown in FIGS. 1A and 1B, the three dimensional framework of SAPO-34 consists of a large central ellipsoidal cavity interconnected to six smaller cavities (only four of the small cavities are shown) through eight-member oxygen rings with opening diameters of 0.38 nm. In general, only molecules with kinetic radiuses of less than 0.38 nm can enter the open pores of SAPO-34 and navigate through its internal channels.

It is now found that the small pore size of SAPO materials is at least partially responsible for the slow ion-exchange rate using conventional liquid ion-exchange methods. For example, in aqueous solutions, metal ions form complexes with water that have large kinetic radiuses. While in complex form, the hydrated metal ions may be too large to enter the small pores of many SAPO materials, thereby preventing the metal ions from participating in the ion-exchange reactions.

In addition, it is found that an alternative solid-state ion-exchange method can be used to prepare Me-SAPO particles with uniformly high ion-exchange levels. Because this method of ion-exchange does not require that the SAPO particles are immersed in a metal salt solution for a relatively long period of time, some of the rate-limiting problems with the liquid ion-exchange method can be avoided. Further, Cu-SAPO-34 particles prepared according to this solid-state ion-exchange method exhibit higher $NO_X$ reduction activity in $NH_3$-SCR systems than Cu-SAPO-34 particles prepared according to conventional liquid ion-exchange methods.

In one embodiment, small particles of transition metal salts or transition metal oxides are formed on surfaces of larger SAPO particles, and thereafter the SAPO particles are heated or calcined in air to initiate a solid-state ion-exchange process. In one embodiment, transition metal salt particles are formed on the surfaces of the SAPO particles by precipitating insoluble transition metal salt particles from an aqueous solution. In another embodiment, transition metal salt particles are formed on the surfaces of the SAPO particles using an impregnation technique.

When transition metal salt particles are formed on the SAPO particle surfaces, the particles are heated or calcined to a temperature and for a time sufficient to decompose the transition metal salts. For example, the particles may be heated to a temperature in the range of about 300-600° C. for about 1-10 hours. During this thermal decomposition step, the transition metal salts decompose and form transition metal oxide particles on the surfaces of the SAPO particles.

Thereafter, the metal oxide/SAPO particles are further heated to produce transition metal cations, and it is found that these metal cations migrate from the surfaces of the SAPO particles and relocate within the pores of the SAPO particles at the ion-exchanges sites within the SAPO framework. In suitable embodiments, the metal oxide/SAPO particles are heated to a temperature in the range of about 500-800° C., more preferably about 650-750° C., for about 12-72 hours. The metal oxide/SAPO particles may be heated in air comprising 0.1-20 vol. % $H_2O$, or in air containing no $H_2O$.

In the following examples, Cu-SAPO-34 particles were prepared from particles of commercially available H-SAPO-34. However, the disclosed solid-state ion-exchange process may be used with a variety of thermally-stable aluminophosphate and silicoaluminophosphate molecular sieve materials. For example, in addition to SAPO-34, SAPO-5, SAPO-11, SAPO-18, SAPO-35, SAPO-41 and SAPO-56 exhibit suitable levels of thermal stability and are believed to be capable of withstanding the high-temperature environment needed to initiate the solid-state ion-exchange process.

In addition, the disclosed solid-state ion exchange process may be used to introduce a variety of metal species into molecular sieves to generate catalytically reactive species or sites. For example, the transition metal salts or oxides may comprise at least one of titanium (Ti), vanadium (V), chromium (Cr), manganese (Mn), iron (Fe), cobalt (Co), nickel (Ni), palladium (Pd), copper (Cu), zinc (Zn), molybdenum (Mo), platinum (Pt), rhodium (Rd), silver (Ag), and zirconium (Zr).

Furthermore, in the following examples, Cu-SAPO-34 catalysts were prepared by forming particles of a copper salt on surfaces of SAPO-34 particles, and thereafter heating the copper salt particles and the SAPO-34 particles to promote the solid-state ion-exchange reactions. As detailed in the following examples, the copper salt particles were formed on the SAPO-34 particles by precipitating copper salt particles from an aqueous solution or by impregnating the SAPO-34 particles with a copper salt solution and then evaporating the liquid. Alternatively, other forms of transition metal-containing particles may be formed on the SAPO particles using different methods. For example, transition metal-containing particles may be formed on the surfaces of SAPO particles using a gaseous medium comprising special transition metal salts, such as $FeCl_3$ and CuCl.

CATALYST PREPARATION EXAMPLES

The following materials were used to prepare copper ion-exchanged SAPO-34 catalysts. H-SAPO-34 powder from Noble Catalysts was used as the precursor material, and based upon inductively coupled plasma and atomic emission spectrometry, it was determined to have the following molar ratios of Al:Si:P=1:0.1:0.9. Ammonium nitrate ($NH_4NO_3$) was obtained from Alfa Aesar, and had >95% purity. 0.05 mol/L copper acetate ($Cu(CH_3CO_2)_2 \cdot H_2O$) solution was obtained from Riedel de Haën, and had >99% purity. Oxalic acid dihydrate $C_2O_4H_2 \cdot 2H_2O$ powder was obtained from Fisher Chemical, and had >99% purity.

Example 1

Liquid Phase Ion-Exchange Method

Using the conventional liquid ion-exchange method, particles of Cu-SAPO-34 were prepared using a two-step liquid ion-exchange process.

First, 100 grams of commercially available H-SAPO-34 powder was added to 500 mL of a 27 wt. % ammonium nitrate solution, and the mixture was heated to 80° C. with stirring for 1 hour. In this first step, the charge-balancing hydrogen ions ($H^+$) in the SAPO-34 particles are replaced or exchanged with ammonium ions ($NH_4^+$) to form particles of $NH_4$-SAPO-34. It is preferable to replace the hydrogen ions of the commercially available H-SAPO-34 particles with ammonium ions before the copper ion-exchange step because the ammonium ions in $NH_4$-SAPO-34 are more easily replaced with copper ions in the following liquid ion-exchange exchange process. The $NH_4$-SAPO-34 particles were then separated from the liquid by filtration, washed with distilled water and dried in air at 100° C. for 16 hours.

It may be necessary to repeat this $NH_4^+$ ion-exchange process to ensure that suitable amounts of the $H^+$ ions of the H-SAPO-34 particles are replaced by $NH_4^+$ ions before the copper ion-exchange exchange process is performed. In this example, the above steps of mixing, stirring, filtering, washing and drying were performed twice.

Thereafter, the $NH_4$-SAPO-34 particles were added to 500 mL of a 0.5 mol/L copper acetate ($Cu(CH_3CO_2)_2$) solution, and the mixture was stirred at ambient temperature for 6 hours. In this step, the $NH_4^+$ ions in the $NH_4$-SAPO-34 particles are replaced or exchanged with copper ions (such as $Cu^{2+}$, $Cu(OH)^+$) to form particles of Cu-SAPO-34. Although, in this example, the $NH_4$-SAPO-34 particles are added to a copper acetate solution, other copper salt-containing solutions may be used, for example, solutions of copper nitrate or copper sulfate may be used. However, it may be easier to decompose the $CH_3CO_2^-$ anion during the following calcination processes so that very little, if any, by-product residue remains after thermal decomposition. The Cu-SAPO-34 particles were then separated from the liquid by filtration, washed with distilled water to remove any $Cu^+$ ions that did not exchange and any residual $CH_3CO_2^-$ ions, and dried in air at 100° C. for 16 hours. Is it necessary to repeat this $Cu^+$ ion-exchange process to ensure that a suitable amount of the $NH_4^+$ ions of the $NH_4$-SAPO-34 particles are replaced by Cu+ ions. For example, it is possible that this Cu ion-exchange process may need to be repeated 2 to 5 times.

This method of catalyst preparation requires repetition of the liquid ion-exchange step because the small pore size of SAPO-34 limits the rate of ion-exchange between the $NH_4^+$ ions and the Cu ions.

After the Cu ion-exchange process has been performed a suitable number of times, the Cu-SAPO-34 particles were then calcined in air at 550° C. for 4 hours. In this step, residual organic compounds are decomposed leaving Cu-SAPO-34 particles that do not contain impurities.

Cu-SAPO-34 catalyst particles prepared according to this method may hereafter be denoted as "Cu-LE", where "LE" stands for the liquid ion-exchange method.

Example 2

Precipitation Method

Cu-SAPO-34 catalysts were prepared by forming particles of $CuC_2O_4$ on surfaces of H-SAPO-34 particles, and thereafter the precipitated mixture of $CuC_2O_4$ particles and H-SAPO-34 particles is calcined to thermally decompose the $CuC_2O_4$ particles and form CuO particles on the SAPO-34 particle surfaces.

First, 10 grams of commercially-available H-SAPO-34 particles were added to an oxalic acid solution comprising 0.84 grams $C_2O_4H_2.2H_2O$ and 150 mL water. 50 mL of a (0.64 g/50 mL $H_2O$) $Cu(CH_3CO_2)_2$ solution was then added to the H-SAPO-34 and $H_2C_2O_4$-containing solution to precipitate particles of copper oxalate ($CuC_2O_4$) onto surfaces of the commercially-available H-SAPO-34 particles. Although H-SAPO-34 particles were used in this example, $NH_4$-SAPO-34 may alternatively be used.

The $Cu(CH_3CO_2)_2$ precursor solution was added to a solution that already contained a suitable of amount of the $H_2C_2O_4$ precipitating agent so that the $CuC_2O_4$ particles would quickly precipitate from the precursor solution. The precipitated mixture of $CuC_2O_4$ particles and H-SAPO-34 particles was then separated from the liquid by filtration, and the solids were dried in air at 100° C. overnight. After drying, the $CuC_2O_4$ and H-SAPO-34 particles were calcined in air at 550° C. for 4 hours. During calcination, the $CuC_2O_4$ particles decomposed, leaving copper oxide (CuO) particles on the surfaces of the H-SAPO-34 particles (CuO/SAPO-34). The copper oxide particles may form on the external surfaces and/or within the micropores of the of the SAPO particles.

CuO/SAPO-34 particles prepared by precipitating copper salt particles from solution onto SAPO-34 particles will be hereafter denoted as "CuO-P," where "P" stands for the precipitation method.

Example 3

Impregnation Method

Cu-SAPO-34 catalysts were prepared by adding small amounts of a copper ion precursor solution to $NH_4$-SAPO-34 particles so that the internal pores of the $NH_4$-SAPO-34 particles are flooded with the precursor solution. These impregnated $NH_4$-SAPO-34 particles are then dried without filtration, and copper salt particles form on the $NH_4$-SAPO-34 particle surfaces.

First, particles of $NH_4$-SAPO-34 were prepared from particles of commercially available H-SAPO-34 as in Example 1. Then, a copper acetate ($Cu(CH_3CO_2)_2$) solution was added to a predetermined volume of the $NH_4$-SAPO-34 particles in an amount sufficient to just fill the pores of the $NH_4$-SAPO-34 particles. In general, SAPO-34 particles have a maximum water adsorption capacity of 0.7 mL $H_2O$/gram. Thus, 7 mL of the $Cu(CH_3CO_2)_2$ solution may be added to 10 grams of $NH_4$-SAPO-34 powder to sufficiently flood the pores with liquid. The concentration of copper in the precursor solution was formulated to yield the desired percentage of copper in the final catalyst particles. By controlling the concentration of copper in the precursor solution, the degree of Cu ion-exchange can be controlled. Although $NH_4$-SAPO-34 particles were used in this example, H-SAPO-34 may alternatively be used. In addition, alternative copper salt solutions may be used instead of copper acetate, for example a solution of copper oxalate, copper chloride, copper nitrate, copper sulfate, or mixtures thereof may be used.

In this impregnation step, it is possible that some of the $NH_4^+$ ions in the $NH_4$-SAPO-34 particles may be replaced or exchanged with copper ions ($Cu^+$) of the copper ion precursor solution. However, the amount of liquid used in the impregnation process was minimized to limit the amount of liquid ion-exchange that may have occurred during this step. In addition, the liquid was quickly evaporated from the impregnated particles to further minimize the amount of liquid ion-exchange.

The impregnated $NH_4$-SAPO-34 particles were heated in air at 100° C. for a time sufficient to completely evaporate the liquid therefrom. After evaporation, $Cu(CH_3CO_2)_2$ particles were formed on surfaces of the $NH_4$-SAPO-34 particles. The $Cu(CH_3CO_2)_2$ particles may form on the external surfaces and/or within the micropores of the of the SAPO particles.

The dried $NH_4$-SAPO-34 particles and $Cu(CH_3CO_2)_2$ particles were then calcined in air at 550° C. for 4 hours. In this step, the $Cu(CH_3CO_2)_2$ particles decompose, leaving copper oxide (CuO) particles on the surfaces of the $NH_4$-SAPO-34 particles (CuO/SAPO-34).

CuO/SAPO-34 particles prepared by impregnating the SAPO-34 particles with a copper salt solution and then removing the liquid will be hereafter denoted as "CuO-I," where "I" stands for the impregnation method.

Example 4

Hydrothermal Treatment

After the particles of CuO are formed on the surfaces of the H-SAPO-34 or $NH_4$-SAPO-34 particles as in Examples 2 and 3, the CuO/SAPO-34 particles were calcined at high-temperature in a humid environment to form particles of Cu-SAPO-34, in which ions of copper are located at ion-exchanges sites within the framework of the SAPO-34 particles. Although, in this example, the CuO/SAPO-34 particles were calcined in a humid environment, the particles may alternatively be calcined in the absence of water.

In this example, the CuO/SAPO-34 catalysts prepared in Examples 2 and 3 were hydrothermally-treated by heating or calcining the catalysts in air comprising 10 vol. % $H_2O$ at a temperature of 700° C. for 48 hours. In this step, it is believed that this extended high-temperature treatment resulted in a solid-state ion-exchange reaction, wherein the non-metal ions of $H^+$ or $NH_4^+$ in the SAPO-34 framework were replaced or exchanged with Cu ions, thereby forming particles of Cu-SAPO-34. Accordingly, this high-temperature hydrothermal treatment process may be referred to herein as a "solid-state ion-exchange process."

Although the exact mechanism of this solid-state ion-exchange reaction is not entirely known, it is believed that at such high-temperatures the CuO particles become unstable, and, after a sufficient amount of time, some Cu ions from the CuO particles may migrate from the external surfaces of the SAPO-34 particles, through the pores, and to ion-exchanges sites within the SAPO-34 framework.

The hydrothermally-treated Cu-SAPO-34 particles prepared by first precipitating copper salt particles from solution onto SAPO-34 particles will be hereafter denoted as "Cu-P/HT," where "P/HT" stands for precipitation followed by hydrothermal treatment. Hydrothermally-treated Cu-SAPO-34 particles prepared by first impregnating the SAPO-34 particles with a copper salt solution and then removing the liquid will be hereafter denoted as "Cu-I/HT," where "I/HT" stands for impregnation followed by hydrothermal treatment.

For comparison, the Cu-LE particles were also calcined in air comprising 10 vol. % $H_2O$ at a temperature of 700° C. for 48 hours. Hydrothermally-treated Cu-LE particles will be hereafter denoted as "Cu-LE/HT," where "LE/HT" stands for liquid-ion exchange followed by hydrothermal treatment.

CHEMICAL COMPOSITION OF THE CATALYSTS

The chemical composition of the catalysts prepared in Examples 1-4 was determined by inductively coupled plasma and atomic emission spectrometry (ICP-AES). The chemical composition of these catalysts before and after hydrothermal treatment is shown in Table 1. The variation in the elemental composition between the catalysts before and after hydrothermal treatment is possibly due to the decomposition of residual organic templates in SAPO-34 at such high-temperatures.

TABLE 1

Chemical composition of the catalysts by ICP analysis

| Sample | Concentration (wt. %) | | | |
|---|---|---|---|---|
| | Al | P | Si | Cu |
| H-SAPO-34 | 18 | 19 | 2.1 | 0 |
| Cu-LE/HT | 19 | 20 | 2.3 | 0.75 |
| CuO—P | 17 | 19 | 2.1 | 0.78 |
| Cu—P/HT | 19 | 21 | 2.3 | 0.89 |
| CuO—I | 18 | 20 | 2.1 | 0.95 |
| Cu—I/HT | 18 | 21 | 2.3 | 1.00 |

$NH_3$-SCR Catalytic Activity of the Catalysts

The NO conversion performance of the as-prepared catalysts was evaluated using a flow-through powder reactor system equipped with a Fourier Transform Infrared (FTIR) spectrometer (Nicolet 670). The gas stream fed to the quartz tube reactor comprised, by volume: 200 ppm NO, 200 ppm $NH_3$, 8% $O_2$, 10% $H_2O$, 10% $CO_2$, with $N_2$ as balance. The total flow rate of the gas stream fed to the reactor was held at 1 L/min. The reactor was filled with 25 mg of catalyst powder diluted by 25 mg of quartz sand to yield a gas hourly space velocity (GHSV) of 1,200,000 $h^{-1}$. Due to the high catalytic activities of these catalysts, high space velocity conditions were used in order to differentiate the activities of the catalyst samples.

Before NO conversion measurements, the catalysts were pre-treated at 550° C. for 30 minutes in an $N_2$ gas flow comprising 8 vol. % $O_2$. The NO conversion performance of each of the catalysts before and after hydrothermal treatment was measured at increasing reactor temperatures from 180 to 550° C. The NO and $NH_3$ conversion performance of the catalysts was calculated based on the chemical composition of the gas stream at the inlet and the outlet of the reactor at steady state.

The commercially-available H-SAPO-34 catalyst showed very low NO conversion performance in the temperature range studied, hence the catalytic activity of the Cu-containing catalysts can be attributed to the addition of the copper species.

Before hydrothermal treatment, the liquid ion-exchanged catalyst (Cu-LE) showed better NO conversion performance than that of the precipitated catalyst (CuO-P) and the impregnated catalyst (CuO-I), even though the Cu loadings of these three catalyst were similar. Considering that different Cu species may be present in these catalysts due to the different preparation methods, it is believed that the location and the state of the Cu species plays a critical role in the catalytic activity of these catalysts.

Figure 2:
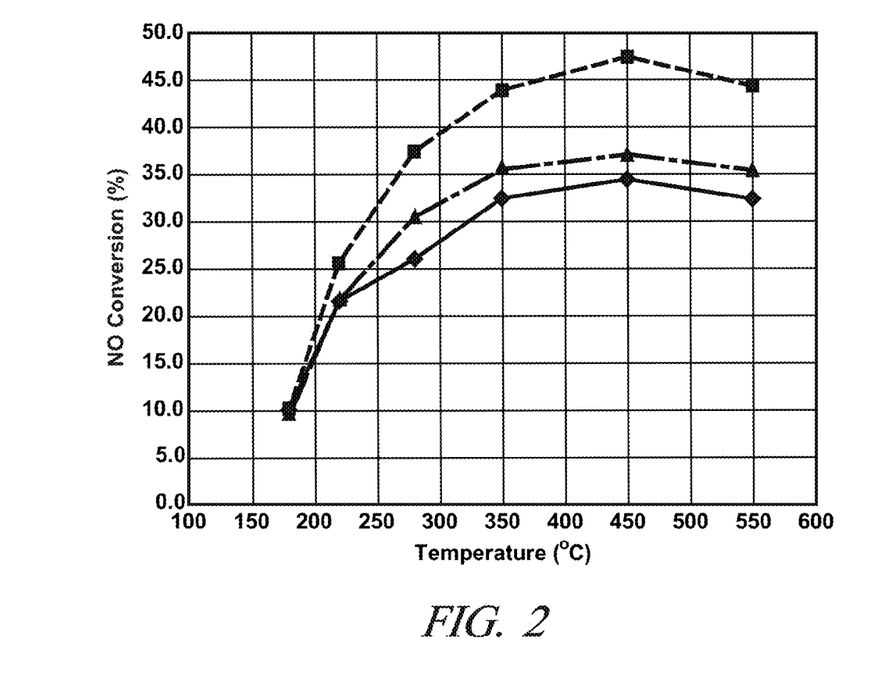
FIG. 2 is a graph of NO Conversion (%) vs. Temperature (° C.) showing the NO reduction performance (using $NH_3$ as a reductant) of three hydrothermally-treated Cu-SAPO-34 catalysts: Cu-LE/HT (solid line with diamond data points), Cu-P/HT (dashed line with square data points), and Cu-I/HT (dash dot line with triangle data points). The catalysts were hydrothermally treated by heating or calcining the catalysts in air comprising 10 vol % $H_2O$ at a temperature of 700° C. for 48 hours. A gas stream comprising, by volume, 200 ppm NO, 200 ppm $NH_3$, 8% $O_2$, 10% $CO_2$, 10% $H_2O$, and $N_2$ as balance was then passed through a quartz tubular reactor that contained a volume of these hydrothermally-treated Cu-SAPO-34 catalyst particles.

FIG. 2 is a graph of NO Conversion (%) vs. Temperature (° C.) and shows the NO conversion performance of the catalysts after hydrothermal treatment, or solid-state ion-exchange, (Cu-LE/HT, Cu-P/HT, and Cu-I/HT). After hydrothermal treatment, the liquid ion-exchanged sample (Cu-LE/HT) showed little deterioration in NO conversion performance, rather its low-temperature performance was improved. This confirms the excellent hydrothermal durability of SAPO-34. More interestingly, after hydrothermal treatment, the Cu-P/HT and Cu-I/HT SAPO-34 catalysts showed much higher activities than the un-treated catalysts (CuO-P and CuO-I). In fact, the hydrothermally-treated catalysts (Cu-P/HT and Cu-I/HT) showed NO conversion performances similar to that of the liquid ion-exchanged catalyst (Cu-LE) before hydrothermal treatment. This suggests that, during hydrothermal treatment, the copper species in the CuO-P and CuO-I catalysts likely change their location and/or their chemical state, and migrate toward sites with much higher catalytic activities, for example at the ion-exchange sites within the SAPO-34 framework.

As shown in FIG. 2, the maximum NO conversion reached by the prepared Cu-P/HT and Cu-I/HT catalysts was about 48% and 37%, respectively when a GHSV of 1,200,000 $h^{-1}$ was used. However, it should be noted that the NO conversion rates of these catalysts are directly dependent upon the gas hourly space velocity of the gas stream fed to the reactor. And, when a GHSV of 300,000 $h^{-1}$ was used, the maximum NO conversion reached by the prepared Cu-P/HT catalyst was increased to about 85%.

Structural Properties of the Catalysts

The phase compositions and structures of the as-prepared catalysts were determined by X-ray diffraction (D8 advance diffractometer) using Cu Kα radiation ($\lambda$=1.5418 Å). The X-ray powder diffractogram was recorded at 0.02° internals in the 2θ range from 10° to 60°.

The XRD patterns of the Cu-containing samples showed a chabazite phase, which is consistent with the pattern of H-SAPO-34, suggesting that the preparation methods of Examples 1-4 do not significantly affect the structure of the SAPO-34 particles.

For the fresh and hydrothermally treated liquid ion-exchange catalyst (Cu-LE and Cu-LE/HT), no copper species (Cu, $Cu_2O$, CuO) diffraction peaks were observed, suggesting that copper is either well-dispersed within the particles or exists as isolated ions at the ion-exchange sites within the SAPO-34 framework. For CuO-P, two diffraction peaks located at 35.29° and 38.49° were observed indicating the presence of a CuO phase. The CuO crystallite size, estimated based on the Sherrer's equation, was found to be about 5.0 nm, which is much too large to be inside the pores of the SAPO-34 particles (pore diameter=0.38 nm). Therefore, it is believed that the CuO particles locate on the external surface of the CuO-P SAPO-34 particles before hydrothermal treatment.

Although the introduction of Cu ions does not significantly influence the crystal structure of the SAPO-34 particles, different Cu species may affect the diffraction peak positions. Compared to particles of H-SAPO-34, the diffraction peaks for the Cu liquid ion-exchanged catalyst (Cu-LE) were shifted to lower diffraction angles, suggesting a lattice expansion of Cu-doped SAPO-34. The lattice expansion could be attributed to the incorporation of Cu ions inside the pores of the SAPO-34 particles. On the other hand, the diffraction peaks in the precipitated catalyst (CuO-P) did not shift positions, consistent with the Cu species existing as CuO on the external surfaces of the SAPO-34 particles. After hydrothermal treatment, the diffraction peaks of Cu-P/HT shifted to lower angles, similar to those for the liquid ion-exchanged sample (Cu-LE). Meanwhile the two diffraction peaks at 2θ values of 35.29° and 38.49°, related to the CuO phase, were not observed for the Cu-P/HT catalyst. This indicates that, during hydrothermal treatment, the CuO species on the external surfaces of the CuO-P SAPO-34 particles disperse and migrate inside the micropores of the SAPO-34 particles.

Morphology of the Catalysts

The transmission electron microscopy (TEM) was executed in a Cs corrected JEOL 2100F TEM/STEM operated at 200 kV.

Figure 3:
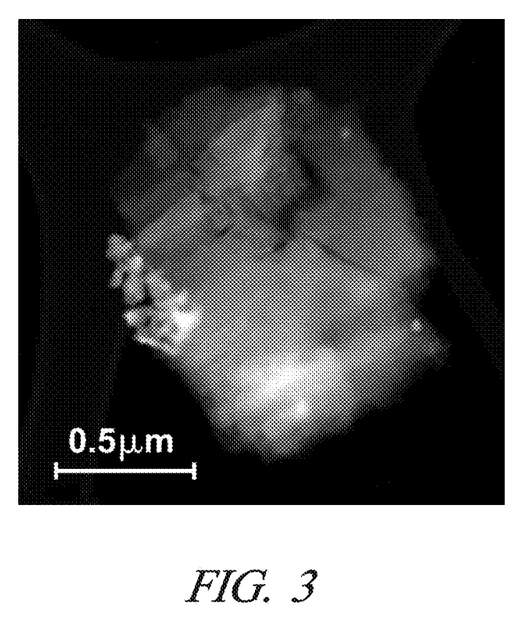
FIG. 3 is a transmission electron microscopy (TEM) image of a single SAPO-34 crystal that has been doped with copper by precipitating particles of $CuC_2O_4$ from solution onto surfaces of H-SAPO-34 particles. Thereafter the precipitated mixture of $CuC_2O_4$ particles and H-SAPO-34 particles was heated to 550° C. for 4 hours to thermally decompose the $CuC_2O_4$ particles and form CuO particles on the SAPO-34 particle surfaces (CuO-P). The CuO particles appear as bright clusters on the external surface of the SAPO-34 crystal.
Figure 4:
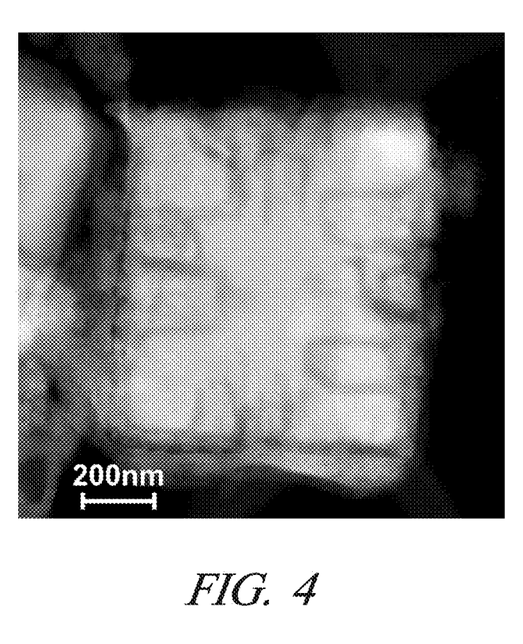
FIG. 4 is a TEM image of a single Cu-SAPO-34 crystal that was prepared using the precipitation method followed by a hydrothermal treatment process wherein CuO-P catalyst particles were heated to a temperature of 700° C. for 48 hours in air comprising 10 vol. % $H_2O$. After hydrothermal treatment, no copper species appear on the surface of the Cu-SAPO-34 crystal. The absence of visible copper oxides species in the TEM image indicates that the CuO particles on the surface of the CuO-P catalyst disperse as isolated ions and migrate into the pores of the SAPO-34 particles during the hydrothermal treatment process to form ion-exchanged Cu-SAPO-34 particles.

TEM images of Cu-SAPO-34 catalysts were taken to examine the morphology of the Cu species and the support SAPO-34 particles. TEM images of H-SAPO-34 particles revealed cubic crystals in the size of 1-3 μm. CuO particles were found to aggregate on the external surfaces of the SAPO-34 particles in the fresh CuO-P catalyst (FIG. 3). The crystallite size of the CuO particles was observed to be in the range of 10-30 nm, which is higher than the value calculated by XRD. This suggests that there are probably smaller CuO particles that are invisible in the TEM images. Since X-ray diffraction measures the average crystallite size, the size estimated from the diffraction peaks is thus smaller than the particle size observed in the TEM images. After hydrothermal treatment, the Cu-P/HT catalyst exhibited a clear pore structure, similar to that of the H-SAPO-34 particles, without any copper species observed (FIG. 4), which was similar to the Cu liquid ion-exchanged catalyst (Cu-LE). Since the isolated copper ions cannot be detected by TEM technique, this further supports the conclusion that CuO particles first precipitate onto the external surfaces of the SAPO-34 particles, then disperse as isolated ions during the hydrothermal treatment process, and finally migrate inside the pores of the SAPO-34 particles. As discussed above in this specification, this conclusion is consistent with the XRD results.

Reducibility of the Copper Species in the Catalysts

Temperature programmed reduction by $H_2$ ($H_2$-TPR) was carried out on a commercial instrument (Micromeritics, Autochem 2920) with a TCD detector. Before the TPR measurements, the catalysts were pre-oxidized at 500° C. followed by helium flow to purge residual gases and weakly adsorbed oxygen. The temperature programmed reduction profile was measured in a flow of argon gas which comprised 10 vol. % $H_2$ at a flow rate of 30 mL/min. The temperature was ramped up from room temperature to 800° C. at a rate of 10° C./min.

Temperature programmed reduction (TPR) measurements were carried out using $H_2$ for the catalysts to probe the reducibility of Cu species. In addition to the reduction temperature, the amount of $H_2$ consumption provides information about the Cu species and their oxidation states. No reduction peak was observed for H-SAPO-34, indicating that the reduction peaks for the Cu-containing catalysts were attributed to the reduction of copper species. The liquid ion-exchanged sample (Cu-LE) showed a broad reduction peak in the temperature range of 150-350° C., which could be related to the reduction of Cu ions on the ion-exchange sites. There are multiple ion-exchange sites possible for the Cu ions (see FIG. 1), and these Cu species could have varying reducibility.

The fresh precipitated sample (CuO-P) exhibited a sharp peak centered at 200° C., similar to the reduction peak in the TPR curve of a physical mixture of CuO particles and H-SAPO-34 particles. This suggests that the Cu species in the fresh precipitated sample are likely $CuO_X$ particles, consistent with the XRD results. However, for the hydrothermally-treated catalyst (Cu-P/HT), the sharp reduction peak at 200° C. disappeared and was replaced by a broad reduction peak similar to that of the liquid ion-exchanged catalyst (Cu-LE). This change in reducibility indicates that the copper species in the precipitated catalyst may occupy different locations before and after hydrothermal treatment. This observation, in agreement with the structural and catalytic data, further confirms that the hydrothermal treatment process causes copper species to be stabilized as isolated ions at ion-exchange sites within the SAPO-34 framework.

Based on the amount of $H_2$ consumption and the Cu loadings, the $H_2$/Cu ratios can be calculated as listed in Table 2. Assuming that all the Cu species are reduced to Cu(0) at the end of the TPR measurements, the percentages of copper ions in different oxide states can be estimated. The liquid ion-exchanged sample contained a large number of $Cu^+$ ions even after hydrothermal treatment. For the precipitated catalysts, most of the copper ions exist as $Cu^{2+}$ ions before hydrothermal treatment, whereas $Cu^+$ ions become the main species after hydrothermal treatment, which is closer to Cu species of the liquid ion-exchanged catalyst. Again this suggests that, during the hydrothermal treatment process, the CuO species in the precipitated catalyst (CuO-P) migrate from the external surface of the SAPO-34 particles to the cation exchange sites, consistent with the change in the reducibility of the Cu species.

TABLE 2

Chemical analysis of the catalysts was obtained by ICP, XPS and $H_2$-TPR

| Catalyst | Cu loading (wt. %)[a] | $H_2$/Cu[b] | $Cu^{2+}$ (%) | $Cu^+$ (%) | Cu/Si on the surface[c] | Cu/Si in the bulk[a] |
|---|---|---|---|---|---|---|
| Cu-LE/HT | 0.75 | 0.76 | 53 | 47 | 0.05 | 0.14 |
| CuO—P | 0.78 | 0.92 | 83 | 17 | 0.42 | 0.16 |
| Cu—P/HT | 0.89 | 0.74 | 47 | 53 | 0.11 | 0.17 |

[a]obtained by ICP
[b]calculated from the $H_2$ consumption in $H_2$-TPR
[c]obtained by XPS Distribution of the Copper Species in the Catalysts The XPS spectra were taken using a commercial VG Multilab 2000 system (America). The spectra were collected using Al Kα (1486.6 eV) radiation and the overall energy resolution was about 0.45 eV. The surface charging effect during measurements was compensated by referencing the binding energy (BE) to the C is line of residual carbon at 284.6 eV.

The elemental distribution and the state of the Cu species on the external surfaces of the SAPO-34 particles were investigated by XPS. The Cu/Si atomic ratios on the surface and in the pores (bulk) of the SAPO-34 particles were calculated from the XPS and ICP results, respectively. For the liquid ion-exchanged sample (Cu-LE/HT), the surface Cu/Si ratio (0.05) was lower than that in the bulk (0.14), consistent with Cu ions at the ion-exchange sites inside the pores. On the other hand, the fresh precipitated sample (CuO-P) showed a higher Cu/Si ratio on the surface (0.42) than that in the bulk (0.16), consistent with predominantly CuO species on the external surface of the SAPO-34 particles. After hydrothermal treatment, the surface Cu/Si ratio for Cu-P/HT decreased to a value (0.11) lower than the bulk ratio (0.17), which again supports the conclusion that the copper species migrate during the hydrothermal treatment process.

The binding energy of the Cu2p transition peaks provides information on the oxidation state of the Cu species. Cu species in CuO show two shake-up satellite peaks at 942.2 eV and 962.5 eV, associated with the main Cu $2p_{3/2}$ transition peak located at around 933.7 eV and the Cu $2p_{1/2}$ transition peak at 954.0 eV, respectively. Since these satellites are not observed for $Cu^+$ and $Cu^0$ species, this feature has been used to distinguish between the $Cu^{2+}$ and $Cu^+$ or $Cu^0$ species. These shake-up satellites were observed only in the spectrum of the fresh precipitated catalyst (CuO-P), which is evidence that CuO particles exist on the external surfaces of the SAPO-34 particles. After hydrothermal treatment, the shake-up satellites disappear, implying the absence of CuO particles after hydrothermal treatment. Compared to the fresh precipitated catalyst (CuO-P), the hydrothermally-treated catalysts (Cu-P/HT and Cu-LE/HT) showed weaker Cu2p transition peaks, consistent with the lower copper concentrations on the surface in these hydrothermally-treated catalysts (Table 2).

Effect of Cu on the SAPO-34 Framework of the Catalysts

Diffuse reflectance infrared Fourier transform spectra (DRIFTS) were measured on a FTIR spectrometer (ThermoNicolet Magna670) using a heatable environmental reaction cell with ZnSe windows, which was connected to a gas-dosing system. Spectra of the catalyst samples were recorded after pre-treatment at 500° C. for 1 hour to remove the adsorbed water and a spectrum of KBr at the same temperature was used as the background.

The DRIFT spectra of the Cu-SAPO-34 catalysts were measured to probe the effect of Cu on the SAPO-34 framework vibrations. Peaks observed in the 3500-3800 $cm^{-1}$ region were related to the OH group stretching vibration modes (υOH). The weaker bands at 3745 and 3678 $cm^{-1}$ were assigned to P—OH and Si—OH species located on the external surfaces of the SAPO-34 particles, respectively. Two stronger bands, at 3627 and 3600 $cm^{-1}$, were assigned as the stretching mode of bridged OH groups Al—(OH)—Si, which are believed to be related to the Brønsted OH groups.

Peaks in the range of 2000-650 $cm^{-1}$ were associated with the internal and external stretching vibrations of the SAPO-34 framework. According to the literature, the band at 1243 $cm^{-1}$ can be attributed to the external asymmetric stretching vibration, whereas multiple bands at 1069-1200 $cm^{-1}$ can be associated with the Al(Si)—O stretching vibrations. The bands at 1966, 1847, 1667 and 1626 $cm^{-1}$ can be attributed to the combination band of T-0 fundamental lattice ring vibration (T=Si, Al). The most intense band in the spectra was found at 1362 $cm^{-1}$, and can be assigned to the bond vibration in the Si(Al)—O cage ($TO_4$). This band is believed to be associated with strong lattice vibrations that produce a specular reflectance contribution to the signal.

For the fresh precipitated catalyst (CuO-P), the spectra resembled that of the commercially-available H-SAPO-34 particles, without a band associated with the Cu species, suggesting that the Cu species in these catalysts do not affect the SAPO-34 framework. However, for the liquid ion-exchanged catalyst, two new bands at 891 and 844 $cm^{-1}$ appeared, which are believed to be associated with an internal asymmetric framework vibration perturbed by copper cations. It is believed that the band at the lower wavenumber is related to $Cu^{2+}$ (oxygen bridged) ions and the band at the higher wavenumber is related to $Cu^+$ (isolated) ions. The presence of these two bands in the liquid ion-exchanged catalyst provides direct evidence for the Cu species occupying the ion-exchange sites inside the SAPO-34 pores. For the precipitated catalyst, these two bands showed up after hydrothermal treatment, and the spectrum for the Cu-P/HT catalyst closely resembled that of the hydrothermally-treated liquid ion-exchanged catalyst (Cu-LE/HT). This strongly suggests that, after hydrothermal treatment, the Cu species in both liquid ion-exchanged and precipitated catalysts are similar.

CO Chemisorption of the Catalysts

CO chemisorption was performed using a gas stream of helium (He) and 1 vol. % CO, with a flow rate of 100 mL/min at room temperature. The catalysts were pre-treated in a He gas stream at a temperature of 500° C. for 1 hour. The background spectra of the catalysts was collected before the CO-containing adsorption atmosphere was introduced. The DRIFTS spectra were recorded in the range of 4000-650 $cm^{-1}$ with a resolution of 4 $cm^{-1}$.

Diffuse reflectance IR spectra of CO adsorption were measured to probe the oxidation state and coordination of the Cu ions in the catalysts. CO can adsorb strongly on $Cu^+$ sites to form stable $Cu^+$—CO species, while CO does not interact with $Cu^{2+}$ cations at ambient temperature. The H-SAPO-34 catalyst did not show any CO adsorption in the range of 2200-2100 $cm^{-1}$. A band at around 2154 $cm^{-1}$, characteristic of $Cu^+$—CO carbonyls species located at isolated $Cu^+$ sites, was observed on the liquid ion-exchanged catalyst, consistent with isolated Cu cations occupying the ion-exchange sites. The spectra for the fresh and hydrothermally-treated liquid ion-exchanged catalysts were similar, suggesting that the hydrothermal treatment process does not significantly impact the Cu species at the ion-exchange sites.

For the fresh precipitated sample (CuO-P), in addition to the main band at 2154 $cm^{-1}$, a shoulder at around 2134 $cm^{-1}$ was observed. This shoulder band is believed to be related to the adsortion of CO on dimeric $Cu^+$ sites ($Cu^+$—CO—$Cu^+$ species). The presence of this lower frequency band is believed to suggest the existence of $CuO_X$ particle aggregates, consistent with the XRD and TPR results. The shoulder band disappeared after hydrothermal treatment, and the spectrum of the hydrothermally-treated precipitate catalyst (Cu-P/HT) closely resembles that of the liquid ion-exchanged catalyst, again suggesting that the Cu species in the hydrothermally-treated precipitated catalyst are similar to those in the liquid ion-exchanged catalyst.

As a weak base, adsorbed CO molecules may also interact with the Brønsted acid sites in the catalysts. Since the background spectra were collected before CO was introduced, the positive peaks indicate the formation of species and the negative ones mean the consumption of the related species. Overall the catalysts, in the 3800-3500 $cm^{-1}$ region, related to the OH groups, the band intensities at 3627, 3600 and 3588 $cm^{-1}$ decreased; meanwhile two bands at around 3683 and 3672 $cm^{-1}$ increased in intensity, together with a broad band centered at 3561 $cm^{-1}$. Based on the assignments of these bands to different types of OH groups, CO adsorption occurs accompanied with the consumption of internal Brønsted acid sites and the formation of external OH groups connected with Si or Al which are less acidic. It was found that the H-SAPO- 34 catalyst and the fresh Cu-precipitated catalyst exhibited more intense negative bands of Brønsted acid sites, whereas the hydrothermally-treated Cu-precipitated catalyst had relatively weaker bands in the same region, consistent with the fresh and hydrothermally-treated Cu liquid ion-exchanged catalyst.

Cu exchange is believed to replace the H$^+$ ions in the bridged OH groups Al—(OH)—Si, further leading to a lower amount of Brønsted acid sites. Taking this into account, it can be deduced that most of the copper ions in fresh Cu-precipitated catalyst locate on the external surfaces of SAPO framework, whereas most of the copper ions in hydrothermally-treated Cu-precipitated catalyst migrate to the ion-exchange sites within the SAPO-34 framework.

Practices of the invention have been illustrated with certain embodiments but the scope of the invention is not limited to such examples.

The invention claimed is:

1. A method of preparing copper (Cu) ion-exchanged SAPO-34 catalyst particles for selectively reducing nitrogen oxides (NO$_X$) to nitrogen (N$_2$) and water using a reductant, the method comprising:
   forming copper oxide particles on surfaces of a volume of SAPO-34 particles, the SAPO-34 particles having a plurality of negative framework charges at least partially balanced by a plurality of non-metal cations comprising at least one of H$^+$ and NH$_4^+$, where
   the copper oxide particles are formed on the surfaces of the SAPO-34 particles either by (i) precipitating particles of a copper compound onto surfaces of the volume of SAPO-34 particles from an aqueous solution of a copper salt, and separating, drying, and calcining in air the SAPO-34 particles and the precipitated particles to form copper oxide particles on the surfaces of the SAPO-34 particles or (ii) impregnating the volume of SAPO-34 particles with an aqueous solution of a copper salt, evaporating the water to form residual particles of the copper salt on the surfaces of the SAPO-34 particles, and calcining in air the copper salt particles to form copper oxide particles on the surfaces of the SAPO-34 particles; and thereafter
   heating the SAPO-34 particles, with the copper oxide particles formed on the surfaces of the SAPO-34 particles, in air comprising 0.1% to 20% water vapor to a temperature and for an amount of time to form copper cations and for the copper cations to replace at least a portion of the non-metal cations.

2. The method of claim 1 wherein in step (i) the copper salt particles are formed on the surfaces of the SAPO-34 particles by:
   adding a predetermined amount of an aqueous copper salt solution to a mixture of SAPO-34 particles and a precipitating agent so that copper salt particles precipitate from the solution.

3. The method of claim 2 wherein the copper salt solution comprises at least one of copper acetate, copper nitrate, copper chloride, copper oxalate, and copper sulfate.

4. The method of claim 2 wherein the copper salt solution comprises copper acetate and the precipitating agent comprises oxalic acid.

5. The method of claim 1 wherein in step (ii) the residual copper salt particles are formed on the surfaces of the SAPO-34 particles by:
   adding a predetermined amount of an aqueous copper salt solution to the volume of SAPO-34 particles; and thereafter
   heating the SAPO-34 particles to evaporate the liquid and form the residual copper salt particles onto the surfaces of the SAPO-34 particles.

6. The method of claim 5 wherein the copper salt solution comprises at least one of copper acetate, copper nitrate, copper chloride, copper oxalate, and copper sulfate.

7. The method of claim 1 further comprising:
   heating the SAPO-34 particles, with their copper oxide particles, in air comprising 0.1 to 20 vol. % water vapor to a temperature in the range of about 500-800° C.

8. The method of claim 1 further comprising:
   heating the copper oxide particles and the SAPO-34 particles in air comprising 0.1-20 vol. % water vapor and to a temperature in the range of about 500-800° C. for 12-72 hours.

9. The method of claim 1 wherein the copper cations comprise at least one of Cu$^{2+}$ and Cu(OH)$^+$.

10. The method of claim 1 wherein the reductant comprises at least one of ammonia and a hydrocarbon.

11. A method of making base metal ion-exchanged silicoaluminophosphates (SAPOs) for use as selective nitrogen oxide (NO$_X$) reduction catalysts, the method comprising:
    forming transition metal oxide particles comprising at least one of cobalt, copper, silver and iron on surfaces of a volume of SAPO particles, the SAPO particles having a plurality of negative framework charges at least partially balanced by a plurality of non-metal cations comprising at least one of H$^+$ and NH$_4^+$, where
    the transition metal oxide particles are formed on the surfaces of the SAPO particles either by (i) precipitating particles of a transition metal compound onto surfaces of the volume of SAPO particles from an aqueous solution of a transition metal salt, and separating, drying, and then calcining in air the SAPO particles and the precipitated particles to form transition metal oxide particles on the surfaces of the SAPO particles or (ii) impregnating the volume of SAPO particles with an aqueous solution of a transition metal salt, evaporating the water to form residual particles of the transition metal salt on the surfaces of the SAPO particles, and calcining in air the transition metal salt particles to form transition metal oxide particles on the surfaces of the SAPO particle; and thereafter
    heating the SAPO particles, with the transition metal oxide particles formed on the surface of the SAPO particles, in air comprising 0.1% to 20% water vapor to a temperature and for an amount of time to form transition metal cations and for the transition metal cations to replace at least a portion of the non-metal cations.

12. The method of claim 11 wherein the SAPO particles comprise at least one of SAPO-5, SAPO-11, SAPO-18, SAPO-34, SAPO-41, and SAPO-56.

13. The method of claim 11 further comprising:
    heating the SAPO particles, with their transition metal oxide particles, in air comprising 0.1-20 vol. % water vapor to a temperature in the range of about 500-800° C.

14. The method of claim 11 further comprising:
    heating the SAPO particles, with their transition metal oxide particles, in air comprising 0.1-20 vol. % water vapor and to a temperature in the range of about 500-800° C. for 12-72 hours.

15. The method of claim 1 wherein the copper salt particles in either step (i) or step (ii) comprise at least one of copper hydroxide, copper nitrate, copper chloride, copper acetate, copper acetylacetonate, copper oxalate, copper sulfate, and copper carbonate.

* * * * *